Figure 6:
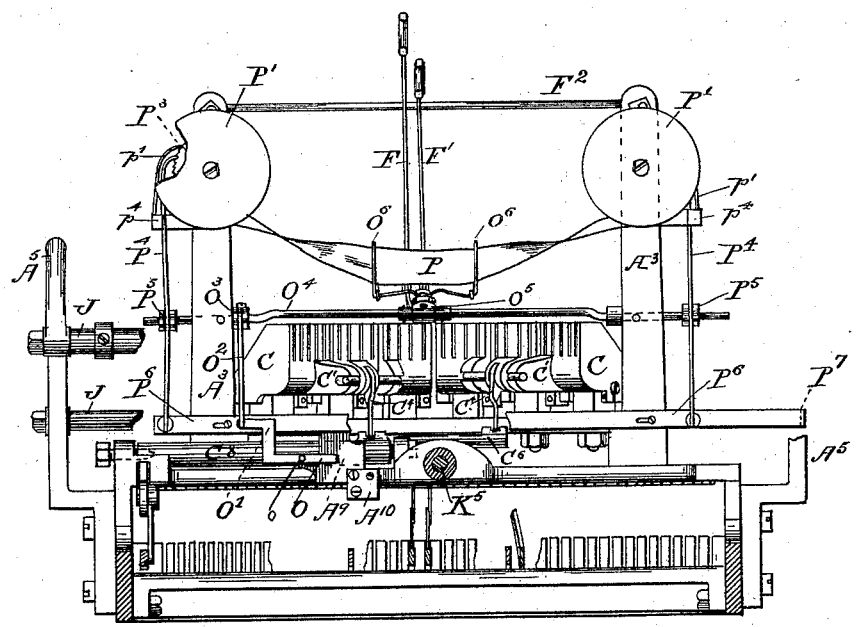

(No Model.)  9 Sheets—Sheet 1.
J. S. COPELAND.
TYPE WRITING MACHINE.
No. 476,251. Patented June 7, 1892.
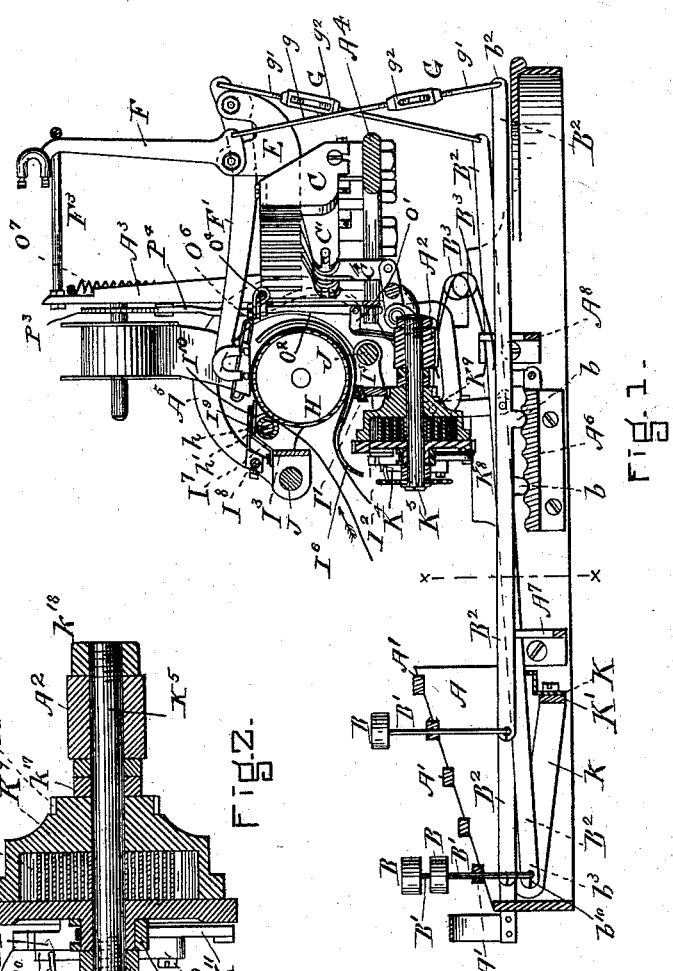
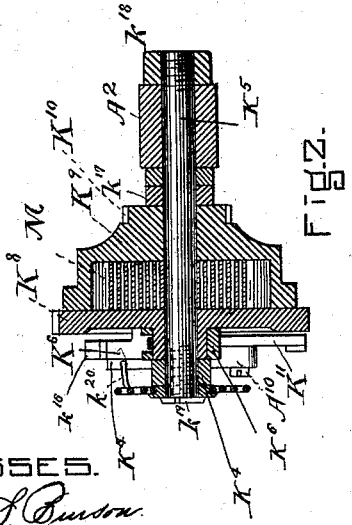
WITNESSES.
Everett S. Burson.
W. H. Dodd
INVENTOR.
James S. Copeland.
By Charles E. Pratt
Atty (No Model.) 9 Sheets—Sheet 2.
J. S. COPELAND.
TYPE WRITING MACHINE.
No. 476,251. Patented June 7, 1892.
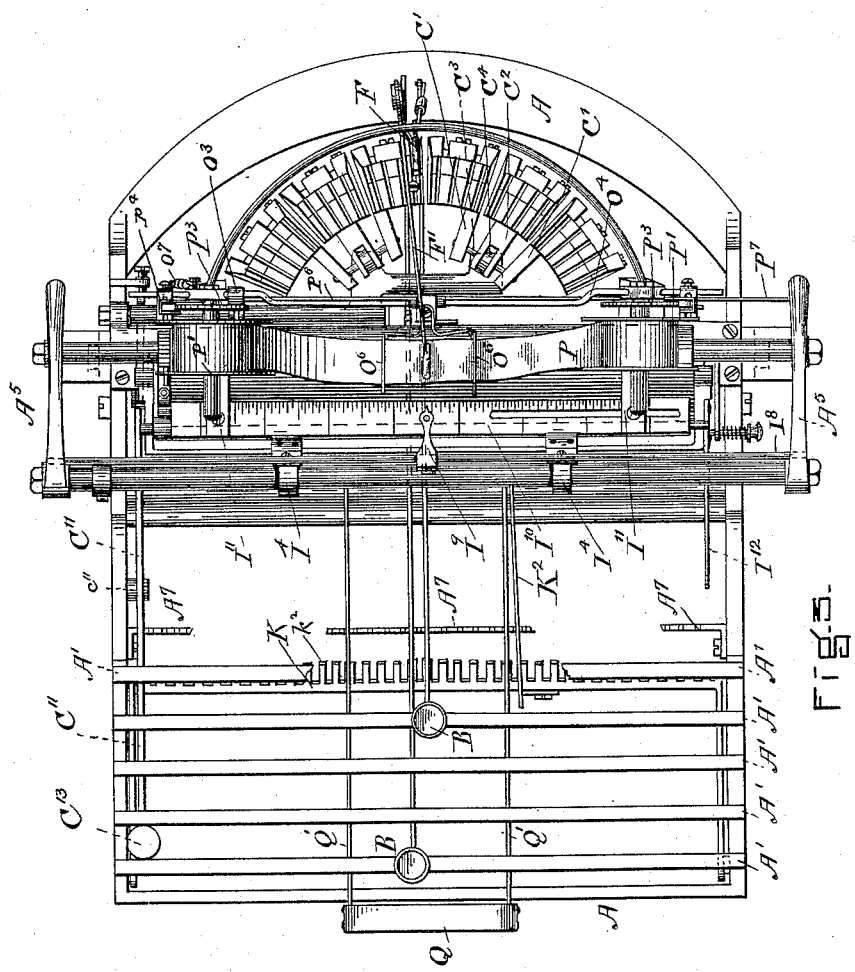
WITNESSES.
Everett S. Benson.
W. H. Dodd
INVENTOR.
James S. Copeland
By Charles E. Pratt
Atty

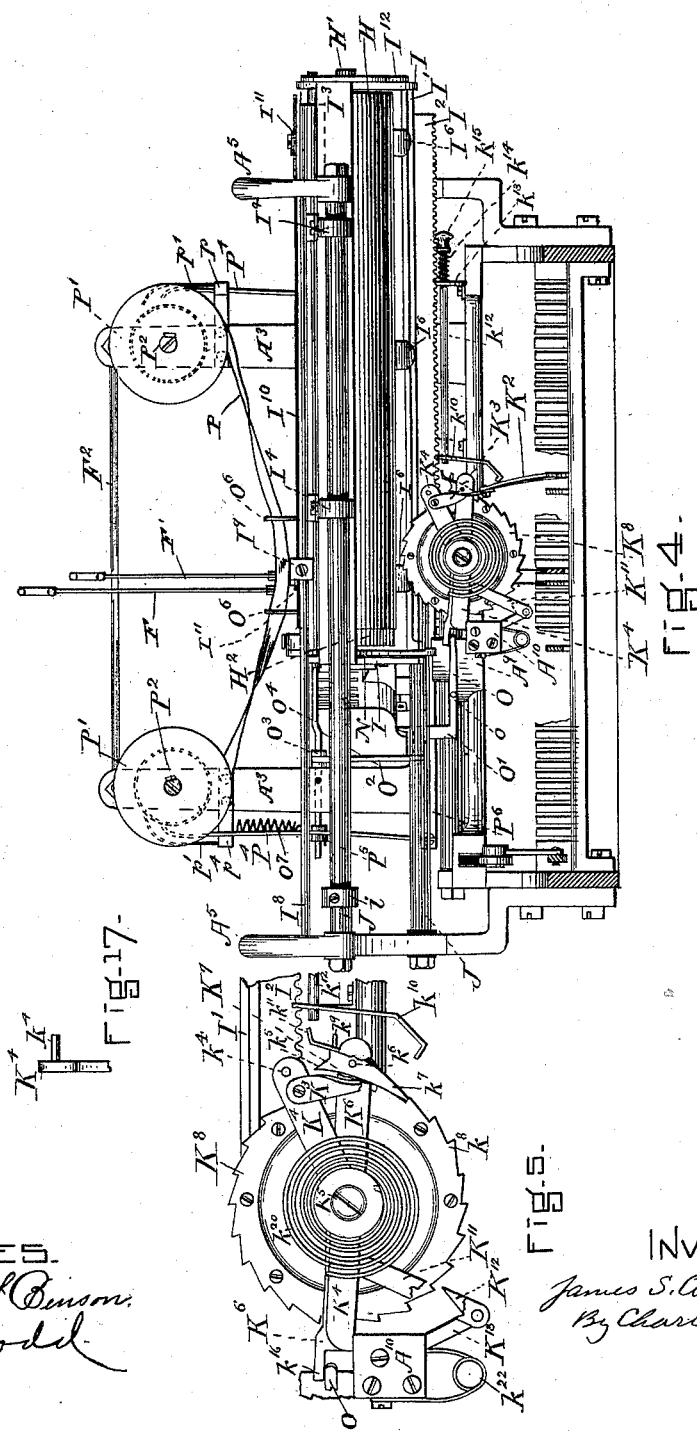

(No Model.)

J. S. COPELAND.
TYPE WRITING MACHINE.

No. 476,251.

9 Sheets—Sheet 4.

Patented June 7, 1892.

WITNESSES.
Everitt S. Benson.
Wm H Dodd

INVENTOR.
James S. Copeland
By Charles E. Pratt
Atty (No Model.)
J. S. COPELAND.
TYPE WRITING MACHINE.
No. 476,251.  Patented June 7, 1892.
9 Sheets—Sheet 5.
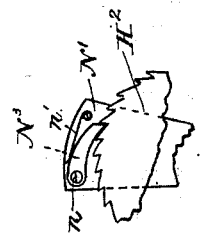
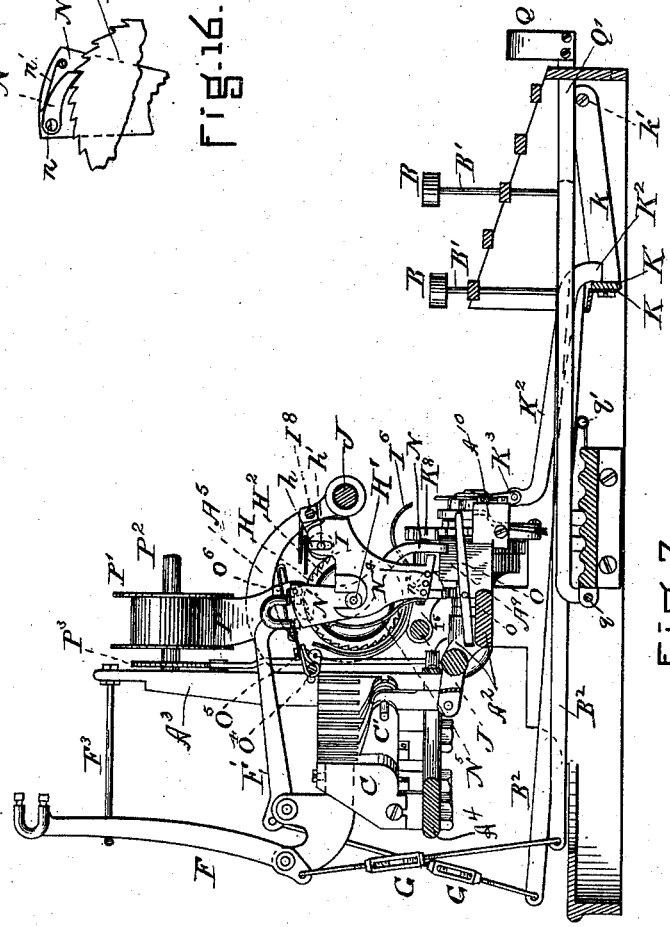
WITNESSES.
Everett K Benson.
Wm H Dodd
INVENTOR.
James S. Copeland
By Charles E. Pratt
Atty (No Model.) 9 Sheets—Sheet 6.

J. S. COPELAND.
TYPE WRITING MACHINE.

No. 476,251. Patented June 7, 1892.

WITNESSES.
Everett S. Benson.
W. H. Dodd.

INVENTOR.
James S. Copeland
By Charles E. Pratt
Atty

THE NORRIS PETERS CO., PHOTO-LITHO., WASHINGTON, D. C.

(No Model.)  9 Sheets—Sheet 7.
J. S. COPELAND.
TYPE WRITING MACHINE.
No. 476,251. Patented June 7, 1892.
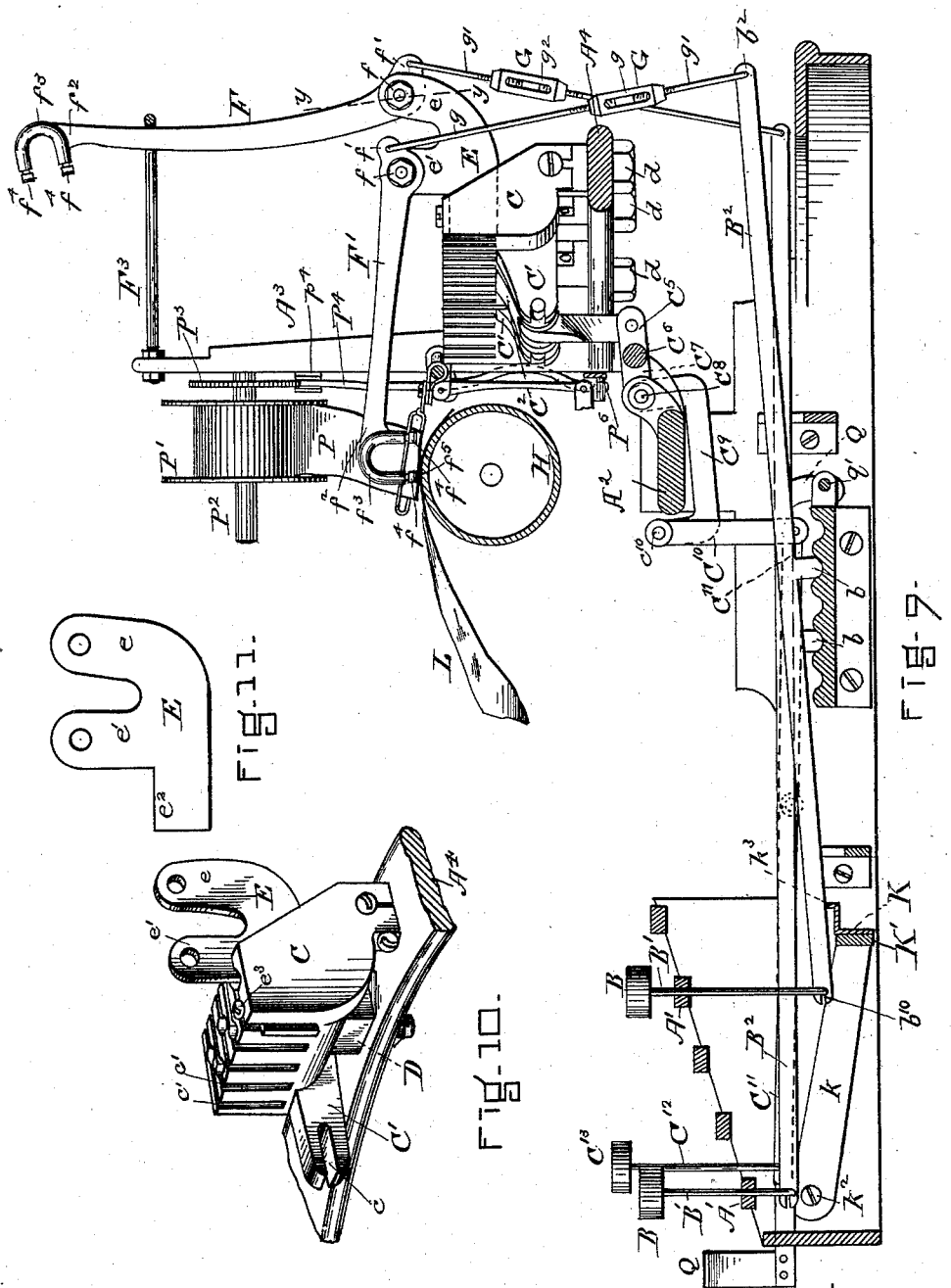
WITNESSES.
Everette R Benson
W H Dodd
INVENTOR
James S. Copeland
By Charles E. Pratt
Atty.

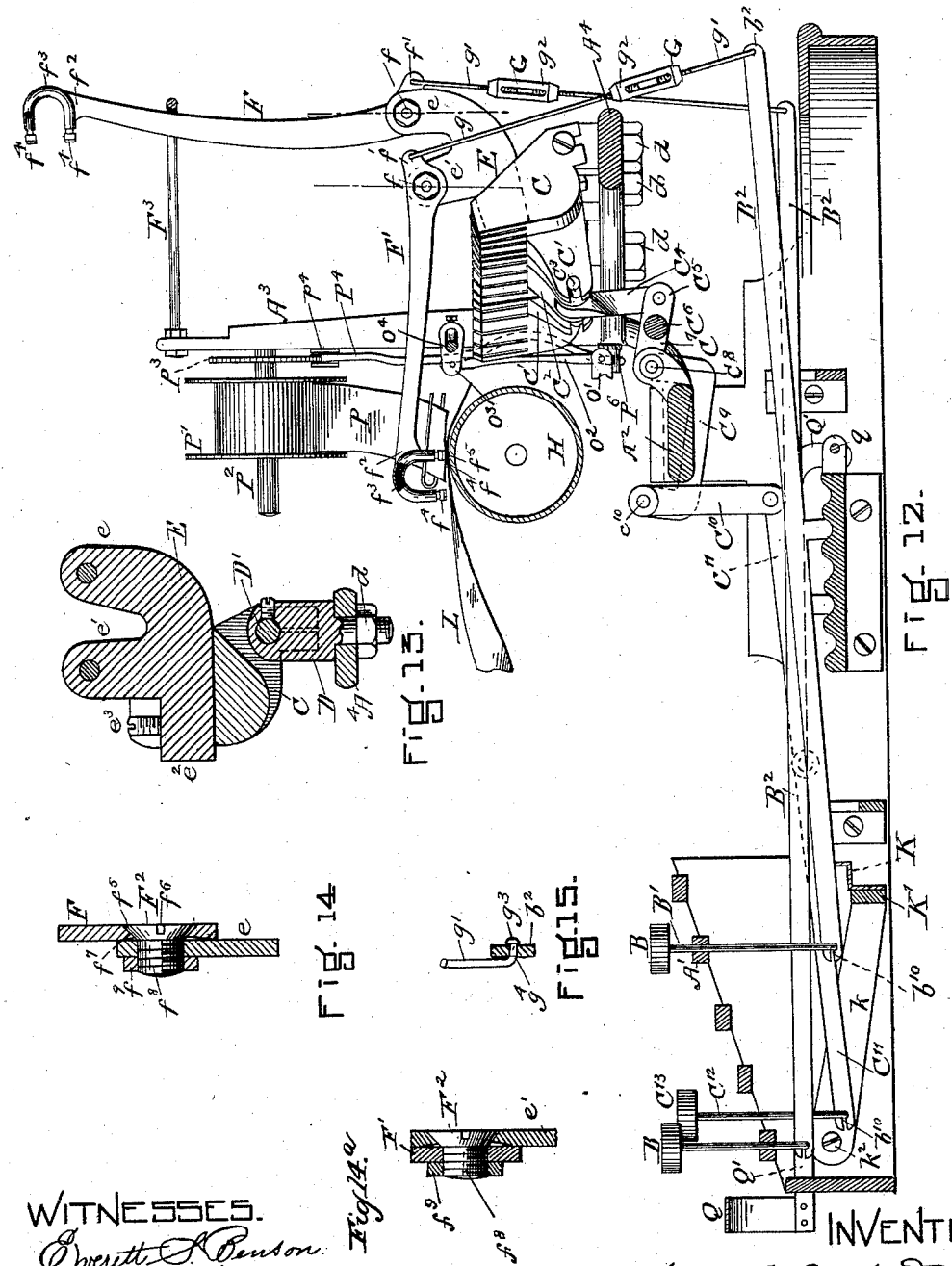

(No Model.) 9 Sheets—Sheet 9.
J. S. COPELAND.
TYPE WRITING MACHINE.
No. 476,251. Patented June 7, 1892.
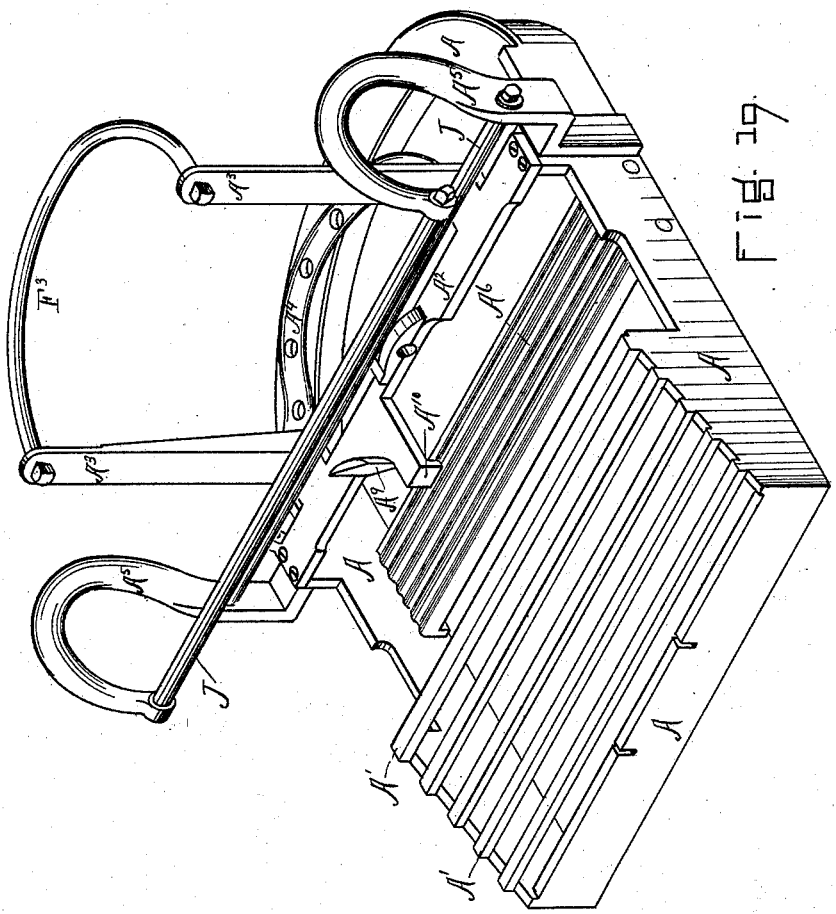

UNITED STATES PATENT OFFICE.

JAMES S. COPELAND, OF HARTFORD, CONNECTICUT.

TYPE-WRITING MACHINE.

SPECIFICATION forming part of Letters Patent No. 476,251, dated June 7, 1892.

Application filed January 13, 1887. Serial No. 224,221. (No model.)

*To all whom it may concern:*

Be it known that I, JAMES S. COPELAND, of the city of Hartford, in the county of Hartford, in the State of Connecticut, have invented certain new and useful Improvements in Type-Writing Machines, of which the following is a specification.

My present invention is in the nature of improvements upon the type-writing machine described and shown in Letters Patent No. 323,495 to B. A. Brooks, dated August 4, 1885, and in the form in which I have embodied them in the machine which I shall presently describe and which is illustrated in the drawings there are certain general resemblances to the Brooks machine which will be apparent. Like it, mine is of the class sometimes called "type-bar machines," and it has, moreover, the key-levers placed horizontally in the base of the machine, and the type bars set at the back of the machine and nearly upright in their inoperative or raised position and operated so that the type ends are thrust forward and downward in action to a printing-point substantially on the top of the platen, and, as in the Brooks machine, I use a grooved fulcrum-plate and a cylindrical platen and have the line as it is being printed upon the paper upon the platen in view of the operator; but instead of using an inking-pad I use an inking-ribbon and operating devices. Instead of a shifting keyboard for operating two different characters on different type-bars through different key-levers I use a shifting mechanism connected with the hinge-supports of the type-bars and two types upon a bar. Instead of a worm device connected with the platen I use a rack-bar and pinion, and I use a different escapement and have introduced divers other modifications; and my improvements consist in certain devices and combinations of devices to be hereinafter pointed out, and as the nature of my improvements will be better understood and discriminated after I have described in detail the type-writing machine illustrated in the drawings and constructed to embody my improvements in one form I will proceed to describe it first; but I will here say that my improvements may be equally applicable in other type-writing machines and that modifications in form and arrangement may be made without departing from the substance of my invention, and I do not mean to limit myself exactly to the things herein described and shown.

Figure 9:
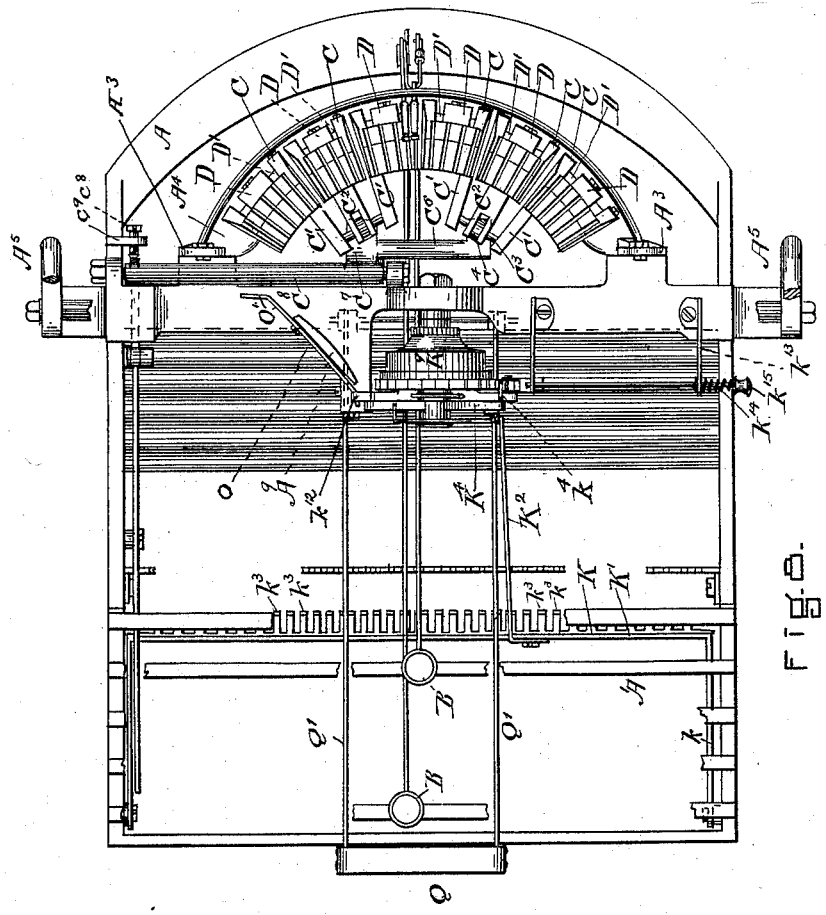
Figure 10:
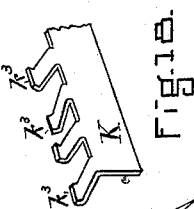

In the drawings, Fig. 1 shows a vertical longitudinal section of the described machine. Fig. 2 shows, enlarged, a portion of Fig. 1, including the power-spring and its surrounding parts. Fig. 3 shows a top plan view of the machine. Fig. 4 shows the machine in transverse sectional elevation substantially from the line $x\ x$ of Fig. 1, looking toward the back of the machine; and Fig. 5 shows in similar elevation the feed-escapement enlarged. Fig. 6 shows a transverse sectional elevation on the same line as Fig. 4, but with the feed-escapement and paper-carriage removed. Fig. 7 shows in part section and in part elevation the same machine viewed from the opposite side of Fig. 1. Fig. 8 shows the machine in top plan view with the paper-carriage and some other parts removed. Fig. 9 shows in enlarged vertical longitudinal section parts of the machine with other parts left out. Fig. 12 shows mostly the same as Fig. 9, but with the advancing-key depressed and the other type of the same bar brought to the printing-point. Figs. 10, 11, 13, 14, 15, 16, 17, and 18 show details of the mechanism. Fig. 19 is a perspective view of the frame of my improved machine with the other parts removed, including both the primary frame and the secondary frame, this latter including the parts $A^2\ A^3\ A^3\ A^4$.

In all the figures the same reference-letters indicate the same parts, and connected parts in the same sub-mechanism are to some extent indicated by the same reference-letters with different exponents to facilitate the understanding of the drawings.

As the whole machine consists in a general way of nine general divisions of connected sub-mechanisms—to wit, the primary and secondary frame-work, the type-actuating mechanism and type-supporting mechanism, the type-shifting mechanism, the paper-holding mechanism, the paper-feeding or letter-spacing mechanism, the line-spacing or paper-turning mechanism, the ribbon-vibrating mechanism, and the ribbon-feed mechanism— I will describe here my improved machine substantially with reference to these divisions in their order.

The primary or base portion of the frame

A A A of the machine, inclosing some of the parts and separating the rest, may be made of a single casting of rectangular form at the front end and of curved form at the back and may have the front ends of the sides raised and sloped or notched to receive the small cross-bars A' A', five of which are shown, and which have vertical holes therein to serve as guides for the key-stems, and which may be set to the desired number in a rising series, like steps. To this primary or base portion of the frame are also attached the transverse main beam $A^2$, upright pillars thereon $A^3$ $A^3$, and an arc beam $A^4$, and by preference I make these four parts—the main beam, pillars, and arc beam—in one integral casting and attach it to the base part A by means of lugs and screws or otherwise at the sides, and this may be called the "secondary" portion of the frame. To the primary portion of the frame are also attached the curved standards $A^5$ $A^5$ for supporting the carriage-ways and the grooved transverse fulcrum-plate $A^6$ and the two transverse guide-bars $A^7$ $A^8$, having vertical slits therein or vertical teeth thereon, which serve to keep the key-levers in position and to guide them in action.

$A^9$ is a cam piece or incline upon the front side of the main beam in the secondary frame, the use of which will be more fully referred to and which I prefer to cast upon and integral with the secondary frame-work.

$A^{10}$ is another attachment of the secondary frame for the support of certain parts to be more fully described.

The type-actuating mechanism and its connections will now be described.

B B are a series of finger-keys, which may bear in the top of them characters corresponding to the characters on the type-bars actuated by them and may be varied in number to operate as many type-bars as are desired to be used.

B' B' are the key-stems, moving freely in the cross-bars A' and connected freely at the bottom with the front ends $b^3$ of the key-levers $B^2$. These key-levers $B^2$ have small fulcrum points or projections $b$ on their under side, one on each lever, to rest in one of the grooves of the fulcrum-plate $A^6$, the object of this grooved fulcrum-plate and of the movable fulcrum-points $b$ $b$ being to allow of an equalization of leverage in the key-levers. To the back end $b^2$ of each key-lever is connected by a free joint, yet to be described, a thrust G, connecting the key-lever $B^2$ with the type-bar F or F', which may bear one or more types. The operation of this part of the mechanism is as follows: When pressure is applied by the finger to the key B, the free end $b^3$ of the key-lever $B^2$ is depressed and the back end $b^2$ of the key-lever is raised and the thrust G forced upward, moving the shorter end of the type-bar and causing the longer part bearing the type to swing forward and downward, and thus to bring the type to the printing-point.

The type-supporting mechanism is as follows: I make a nest-block C, mounted by a hinged bearing on a lug D, attached to the arc beam $A^4$, and with it an arm C', by which it may be oscillated, and in it I secure adjustably a bracket E, having a lug $e$ for the support of the hinge $f$ of the type-bar F, and though I show the construction of these parts as somewhat more complex than is so far described it is obvious that they may be used in this simple form, and the objects of these parts are, first, to afford an oscillating or practically vibrating support for the type-bar hinge, by means of which the type-bar may be thrown backward and forward toward and from the printing-point of the platen in a substantially radial direction a distance equal to the distance between two types which may be borne upon the same type-bar and so as to bring either one or the other of the plurality of types to the printing-point, as desired, and, second, to afford a comparatively permanent and secure but at the same time adjustable connection between the hinge of the key-lever and the oscillating block, so that in assembling the machine or in repairing it or adjusting it afterward the immediate support of the type-bar hinge may be suitably and separably adjusted. By preference I mount two type-bars of different lengths F and F', the shorter within and slightly forward of the longer, upon the same bracket E, and as all the types are to be brought to the same printing-point I arrange the whole series of longer outside type-bars in the arc of a circle described about that printing-point and the whole series of shorter or inside type-bars in the arc of a second inner or smaller circle about the same printing-point and mount these type-bars upon brackets E, which latter must lie in the direction of a radius of the two circles and are arranged in series, each to bear one shorter and one longer type-bar. Each bracket E, I therefore construct of a single piece of sheet metal to have the lugs $e$ $e'$ for the hinges of the type-bars and the stem $e^2$ for insertion in a slot $c'$ in the oscillating block C, where it may be held in position as it may be adjusted backward or forward in the slot by the small screw $e^3$, although this oscillating block C might be made smaller and simply to bear one bracket E, and one type-bar or one pair of type-bars, as F F'. I prefer to make it larger and to bear several such brackets or type-bars, and therefore I construct it and its connections in the following manner: The whole series of bars with their brackets or hinge-supports, or the two series of type-bars with their brackets or hinge-supports, if two series be used, being arranged in the arc of a circle described about the printing-point, the oscillating blocks C are to be also arranged substantially in the arc of a circle described about the printing-point or a line through the printing-point substantially perpendicular to the plane of the arc, and I divide the whole series of oscillated supports for the brackets E into a series of nest-blocks C, each forming a segment or part of the arc, each having several slots $c'$ $c'$ for the brackets E, each also having an arm $C'$, by which it may be oscillated, and each having lugs for connection with a trunnion-joint $D'$. These supports D are arranged in a series, one for each nest-block, upon the arc beam $A^4$, to which they may be secured by nuts $d$ or in any suitable manner. In this machine, as shown and described, there are two groups of these nest-blocks, each group consisting of three nest-blocks with spaces between them, each end block in the three having its arm in the form $C'$, with an open slot $c$ to receive a moving pin or trunnion, and the middle block having its arm in the form $C^2$, having a vertical slot to receive the end of the link $C^4$, through which is passed the pin or trunnion $C^3$, and this construction and arrangement of the joints allows for free action of the link-pin upon all three of the blocks in each group. There is a similar link $C^4$ and trunnion $C^3$ for each group of these nest-blocks, each link being connected to an arm or projection $C^5$ or an extension $C^6$, connected by a lug $C^7$ with a rock-shaft $C^8$, mounted in bearings connected with the main beam transversely to the machine. The rock-shaft $C^8$, Fig. 8, extends only by the arm $C^9$; but to provide means for actuating the right-hand groove of nest-blocks I add to the arm $C^7$ the extension $C^6$, as shown in Fig. 8. To this rock-shaft $C^8$, I have attached a bent lever-arm $C^9$, extending downward and forward under the main beam, where it is connected by the joint $c^{10}$ and link $C^{10}$ with the back end of the lever $C^{11}$, which is pivoted to the side of the frame near its middle portion and is reached at its forward end by the stem $C^{12}$ of the key $C^{13}$, by which this part of the mechanism is actuated. This whole type-supporting and type-shifting mechanism is at rest when, as shown in Fig. 9, the outer or first type on a bar is actuated by depressing the finger-key B and bringing the first type to the printing-point; but when it is desired to bring the second or inner type on the same bar to the printing-point the operator first depresses the key $C^{13}$, thereby through the lever $C^{11}$ and link $C^{10}$ raising the forward end of the arm $C^9$, thereby rocking the shaft $C^8$ and depressing the parts $C^7$, $C^6$, and $C^5$, pulling down the links $C^4$ and the trunnions $C^3$, and thus through the arms $C'$ oscillating the blocks C and vibrating the brackets E and the hinges of the type-bars forward radially toward the printing-point, so that when the operator now depresses the key B and brings the type-bar $F'$ down it is to bring the second or inner type to the printing-point, as shown in Fig. 12, and upon the release of the key $C^{13}$ all the parts resume their previous position, as shown in Fig. 9. As the shifting-key $C^{13}$ is neither depressed nor released while a type is in contact with a ribbon or paper, but only before or after it is struck, and when the key B is released there is no blurring or smearing of the paper and the two actions never conflict. The screw $c^8$ in the lug $c^9$ (shown in Fig. 8) operates as an adjustable stop to the arm $C^9$ and limits the backward action of the nest-block-actuating mechanism, which is caused—that is to say, the return of these type supporting and shifting parts to their former position after being thrown forward and released—in this construction and arrangement by the slight excess in weight of the brackets, type-bars, and connections on the back side of verticals through the hinges of the nest-blocks C without the aid of springs or other devices.

The type-bars F, I construct, by preference, of sheet metal similar in thickness to that of the brackets E and connect one long bar F on one side of the bracket E on the lug $e$ and one short bar $F'$ on the other side of the bracket E on the lug $e'$ by means of a joint shown in Fig. 14 and constructed as follows: I make the hole for the hinge in the bar tapering, larger on the outside and smaller on the inside, so as to afford an inclined or conical bearing-surface, as at $f^7$, for and corresponding to a similar tapered or inclined bearing-surface $f^5$ on the head of the screw or bearing pin $F^2$, having the slot $f^6$ for a screw-driver, and a threaded portion $f^8$, extending through the lug $e$, and the lug $e$ and the bar F have parallel adjacent bearing-surfaces, and a nut $f^9$ works on the threaded portion of the bearing pin or screw $F^2$, and the whole is arranged and constructed so that by loosening or tightening the nut $f^9$ the bearing-surfaces of the bar F on the pin $F^2$ and the lug $e$ are made tighter or freer at pleasure, and thereby a steady true bearing is effected, which is at the same time adjustable for correctness of work and to take up for wear in use.

I further construct the type-bar F with a short arm $f'$ to receive the thrust-link G at one end and with a longer arm to receive the type-bearing device $f^3$ at the other end $f^2$ of the bar. This type-bearing device $f^3$ I make of tubular form, into which the type $f^4$ is set and fixed and may be moved to adjust it so as to leave its impress properly aligned upon the paper at the printing-point, and this tubular part $f^3$ I attach to the end $f^2$ of the bar F by brazing, soldering, or in any approved manner, though it may be constructed therein by tooling.

$F^3$ is a circular arc guard or stop connected with the upright arms $A^3$ $A^3$ and passing around the series of type-bars on the back side to limit their backward motion.

The thrust-link G, I construct of two wires $g$ $g'$, preferably one shorter than the other and arranged so that in any two adjacent thrust-links the longer wire $g$ of one shall be adjacent to the shorter wire $g'$ of the other as a matter of convenience to save space and also to prevent clashing of the turnbuckles $g^2$ and also for convenience of access in adjusting. These two wires in each thrust are threaded, one with a right-hand and the other with a left-hand thread, and the turnbuckle $g^2$ is correspondingly threaded, so that when the turnbuckle is revolved upon the wires it tends either to draw both toward its central point or else to force both from its center, and thus adjust the length of the thrust. The ends of these wires $g$ $g'$ remotest from the turnbuckle I form, as shown in Fig. 15, with a quick bend through the arc of a small circle and with a rivet-head, so that each wire may be inserted by its threaded end, as in the back end $b^2$ of the key-lever or in the short arm $f'$ of the the type-bar, and brought to a position, as shown in Fig. 15, in which the head $g^3$ bears against one side of the piece connected. The turn $g^4$ is partly in and partly against the other side of the piece connected, and the main portion of the wire $g$ or $g'$ lies parallel with the face of the connected part $b^2$. This construction furnishes a free and easy joint convenient and certain of assembling, and also facilitates the adjustment of the length of the thrust-link by means of the turnbuckle, the joint not being at all injured by any force applied to the turnbuckle necessary to adjustment.

In connection with the key-levers $B^2$, I use grasshopper-springs $B^3$ $B^3$, placed above the levers by preference and between the fulcra $b$ and the thrust-links and so as to rest one part upon the lever and one part against the transverse main beam. These grasshopper-springs by reason of the elasticity of the coils are very light and easy and tend by their action to restore the key-lever to its proper position of rest after it has been depressed by the key B and released and at the same to restore the type-bars to their upright position of rest against the guard-stop $F^5$.

The paper-holding mechanism consists, first, in a cylindrical platen H, which I arrange transversely to the machine, which has an elastic outside surface and which is mounted on an axis H′ in the carriage end pieces I I. The carriage end pieces I I are connected by a rigid bar I′, to the under side of which is rigidly attached a rack-bar $I^2$, and also by another rigid bar $I^3$. To each of these bars $I^2$ $I^3$ are attached lugs $I^4$ $I^4$ $I^5$ $I^5$, by which the carriage is held freely and allowed to slide longitudinally upon the cylindrical ways J J. These ways J J are supported firmly in the standards $A^5$ $A^5$.

$I^6$ $I^6$ are thin strips of sheet metal attached to the upper side of the carriage plate or sill thereon and curved downward slightly in front of and beneath the platen H and curved to correspond with the platen and to be a slight distance from its cylindrical surface and to extend backward and upward to serve as paper-guides. I generally use a third strip, as $I^6$, placed near the left end of the platen, like the one near the right end, (shown in Fig. 4,) but have omitted it here in the drawings, as it is just like the other. To the upper carriage-bar $I^3$ is attached by means of brackets $I^7$ a thin strip of metal graduated to form a scale, and which also carries other thin strips of metal $I^{11}$ $I^{11}$, extending backward over and partly around the platen H, to serve as additional paper-guides.

$I^9$ is a pointer pointing to the printing-point on the platen and beneath which the graduated strip $I^{10}$ passes, this pointer $I^9$ being supported upon a rod $I^8$, held in the standards $A^5$ $A^5$, parallel with and above the upper carriage-way J. A small cylindrical pressure-roll $h$ is also mounted by journals $h'$ $h'$ in the carriage end pieces I I, and this pressure-roll is covered with an elastic surface and is held so as to impinge with a gentle pressure upon the surface of the platen H, and this pressure may be derived either from a spring or from the weight of the pressure-roll.

The paper L, upon which the type-writing impressions are to be made, is to be entered with its intended upper edge beneath the upper way J and the upper carriage-plate $I^3$ and between the pressure-roll $h$ and the platen H and moved upon and over the latter and between the surface of the platen and the paper-guides $I^{11}$ $I^{11}$ to a sufficient distance to receive the first line of impressions. It is then to be carried by the revolution of the platen, through mechanism yet to be described, so as to wind about the platen downward and between it and the paper-guides $I^6$ $I^6$ $I^6$, forward and outward again on the under side of the platen, in which direction it may be withdrawn.

I will now describe the letter-spacing or paper-feeding mechanism.

K is a space-bar extending transversely beneath the key-levers, and which I construct of a strip of metal cut with transverse slits, so as to present on one side a number of narrow strips, like the teeth of a comb, but which are bent with different curves or to different degrees, so that the ends of the teeth, being upward, shall extend to varying distances above the middle line of the space-bar, corresponding to the amount of depression required in the bars beneath which these bent teeth respectively are. The key-levers $B^2$ $B^2$, when they are depressed, impinge upon the ends of these teeth upon the space-bar K and cause it to be depressed to a greater or less extent, and by this means, through the mechanism as it will be more fully described, a variable spacing is provided for the letters in the same line, so that each letter shall have its appropriate space, wide letters more space than narrow ones, and I adjust or graduate the space-bar by bending these curved teeth thereon instead of by cutting or filing. This space-bar K is mounted on a strip of metal K′, extending across the base of the machine, but within the frame, and connected by the arms $k$ to hinges $k'$, so that the space-bar may swing downward and upward through a small arc, its downward movement being caused by the depression of the keys and key-bars and its upward or return movement being caused by the mechanism connected with it through the arm $K^2$, rigidly secured to the bar K or strip K' at its forward end, and connected by a hinged joint at its rear end by means of a link $K^3$ to the escapement rock-lever $K^4$. This rock-lever $K^4$ is mounted freely to vibrate on the stud $K^5$ and is pressed upon at the part opposite to the link $K^3$ by a spring $k^{20}$ and caused to rest when not in action against the bracket $A^{10}$, secured to the frame-work. The action of this spring $k^{20}$ upon escapement-bar $K^4$ thus by the connections described holds the finger $k^4$ out of contact with the escapement mechanism and also holds the spacing-bar K in its upward position ready to receive its actuating impulse from a key-lever or a space-lever. The stud $K^5$ is held rigidly in the main transverse beam $A^2$ or in a lug or bracket thereon and extends forward perpendicularly to and beneath a paper-carriage platen, and it may be secured in the bar by means of nut $k^{18}$ and collar $k^{17}$. Upon the stud are freely mounted a ratchet or escapement wheel $K^8$ and a drum $K^9$ and a pinion $K^{10}$. The pinion $K^{10}$ and escapement-wheel $K^8$ are connected by the drum $K^9$, so as to revolve together upon the stud $K^5$. Within the drum $K^9$ is the main spring M, one end of which is secured to the stud and the other end secured to the drum or some part connected therewith, and by its tension between the stud and the escapement-wheel it tends to rotate the latter, and therefore the pinion $K^{10}$, backward toward the left, and as the pinion engages with the teeth of the rack-bar $I^2$ it tends to throw the paper-carriage toward the left, and when the escapement-wheel is released the main spring tends to hold the carriage and its platen and paper to its extreme position at the left. The carriage may be drawn toward the right to any desirable position for printing by means of the finger-arm $I^{12}$. The main spring is thus wound up to greater tension about the stud $K^5$ and tends to rotate the escapement-wheel $K^8$ and the pinion $K^{10}$, engaging with the rack, and thus to throw the carriage back toward the left, which it is only prevented from doing by means of the click $K^7$ engaging at its smaller end $k^7$ with the teeth $k^8$ of the escapement-wheel. Mounted on the stud $K^5$ or on a hub or projection from the escapement-wheel and between the escapement-wheel and the escapement-arm $K^4$ is a click arm $K^6$, bearing at one end by a hinge-joint, at $k^6$, the click $K^7$, and finding a rest at the other end upon the bracket $A^{10}$. The click $K^7$ is free on the pivot $k^6$, by which it is connected to the click-arm $K^6$, and a spring $k^9$ tends to keep its smaller end $k^7$ in engagement with the ratchet-teeth $k^8$ of the escapement-wheel $K^8$. The opposite end, however, of the click $K^7$ is forked, so as to have a short prong with an incline $k^5$ and a longer prong $k^{11}$, by either of which prongs it may be pressed so as to release the smaller end $k^7$ from engagement with the teeth of the escapement-wheel. When the escapement-arm $K^4$ is operated by the depression of the arm $K^2$ and the link $K^3$, the pin $k^4$ (shown at Fig. 17) on the back side of the escapement-arm $K^4$ is caused to impinge upon the incline of the fork $k^5$, and so to rock the click $K^7$ and release its smaller end $k^7$ from engagement with the teeth $k^8$ and at the same time depress the click end of the click-bar $K^6$ to a distance of one or more teeth of the escapement-wheel, according to the extent of the depression, and this depression of the click is accompanied by a rise of the opposite ends of the escapement-bar $K^4$ and the click-bar $K^6$, permitting the stop-arm $K^{11}$, which rests at its upper end against the escapement-arm $K^4$ and is connected at its lower end to the catch $K^{12}$, to rise, thus bringing the catch $K^{12}$ into engagement with a tooth $k^8$ of the escapement-wheel and holding it until the return of the mechanism. The catch $K^{12}$ is connected rigidly on or near to the stop-bar $K^{11}$ and also to the arm $K^{13}$, hinged to the bracket $A^{10}$, and forced by the pressure of a spring $k^{22}$ toward the escapement-wheel. Each time the click $K^7$ is released from engagement with the escapement-wheel for one or more teeth and held away by the escapement-bar $K^4$ and its finger $k^4$ and the space-bar mechanism the escapement-wheel is held at first by the catch $K^{12}$; but on the return of the escapement bar and mechanism the catch is released and the escapement-wheel allowed to turn one or more teeth, according to the depression of the click, until the click again engages with the escapement-wheel, and so the rack-bar $I^2$ and carriage and platen are allowed to move toward the left for a graduated space accordingly, and this gives the variable letter-spacing. On the right-hand side of the machine, just forward of the rack-bar and held by brackets $k^{10}$ $k^{13}$ upon the frame of the machine, is a releasing-rod $k^{12}$, having a knob or finger-key $k^{15}$ at its outer end and having its inner end adjacent to the prong $k^9$ of the click $K^7$. The spring $k^{14}$ tends to hold the releasing-rod $K^{12}$ and knob $K^{15}$ toward the right; but when pressure is applied to the knob $K^{15}$ the releasing-rod $K^{12}$ is moved toward the left to engage with the prong $k^{11}$, and thus release the click from the escapement-wheel and allow the main spring to throw the carriage back for a greater or less distance even to its extreme left position, according as the pressure is conducted.

The paper-turning or line-spacing mechanism may be described as follows: N is a rock-arm pivoted on the platen-axle H', with its lower end bent forward and downward below the lower carriage-bar I' and with its upper end N' extending above the platen. Fixed on the end of the platen H is a ratchet-wheel $H^2$ adjacent to the arm N' and on the inside of the arm N', as shown in Fig. 16, is a pawl $N^3$, hinged at $n$ to the arm N', and having a spring $n'$, tending to keep the smaller opposite end engaged with the teeth in the ratchet $H^2$. On the carriage end plate I is an extension $N^4$, Fig. 7, in which I have made three small holes for the insertion of a pin in either, as at $n^2$ $n^2$ $n^2$, this pin being a stoppin, against which the lower end of the arm N may rest. A spring $N^5$, attached at one end of the arm and resting its other end against the arm N', tends to keep this platen pawl-arm N forward until the lower end of the arm N strikes the small pin in one of its positions $n^2$ and is stopped by it. On the main beam of the frame is an incline or cam $A^9$, this incline and the lower end of the arm N being so placed in relative positions that as the platen and paper-carriage are brought to the extreme right for the beginning of a line the arm N will impinge against the cam-face of the incline $A^9$ and be thrown forward by it, and thus the other end or pawl-carrying end of the arm N' will be thrown backward and through the pawl the platen will be turned through a small arc and the paper move a space for another line. As the carriage is again returned toward the left the arm N will be set free to return to its former position under the action of the spring $N^5$ or until it brings up against the stop at either of the positions $n^2$, and thus by changing the stop to either of those positions the advance through which the arm N moves may be graduated, and consequently the number of teeth which the pawl $N^3$ recedes over will be regulated or varied, and so the distance between the lines of the printed impressions be regulated.

I now come to the ribbon-moving mechanism, and it is to be observed that by my device the ribbon P, which is held above and longitudinally along the platen, has two motions imparted to it by which on the one hand it is vibrated or elevated and lowered and on the other hand it is fed along to offer new surface to the types.

O is a ribbon-actuating lever pivoted at $o$ to the frame of the machine or a projection therefrom, with its forward end extending forward to and under a finger or extension $k^{12}$ upon the click-bar $K^6$, and the other end of this ribbon-actuating lever is carried backward and its bent portion O' is connected by a link $O^2$ and an arm $O^3$ with a rocking shaft $O^4$, on which the arm $O^3$ is sleeved and set with a screw or otherwise rigidly fixed. This rock-shaft $O^4$ is mounted in bearings attached to the secondary part of the frame and extends transversely substantially across and between the two pillars $A^3 A^3$, and at about its middle portion is fastened to it and projecting forward from it a bracket-arm $O^5$. To this bracket-arm $O^5$, I attach a ribbon-vibrating arm $O^6$, which I construct of a piece of wire held at it its middle part by a screw-clamp or equivalent means to the arm $O^5$ and bent in two branches, each of which is further bent first laterally and then forward and then backward beneath and to itself, so as to form an oblong flattened loop through which the ribbon passes. These loops of the vibrator $O^6$ are placed a little distance apart parallel to each other, so as to afford room for the types to strike the ribbon between them and so that the ribbon which lies in them shall at all times cover the printing-point. Now the end of the click-bar $K^6$, having on it the stud or finger $k^{16}$, is at all times when the escapement-bar $K^4$ is at rest pressed downward against the bracket $A^{10}$ by the action of the main spring and escapement-wheel and the click $K^7$, and so the forward end of the ribbon-moving arm O is held down, and therefore through the connecting devices the ribbon-vibrator $O^6$ and the ribbon in it are held up away from the paper on the platen. The object of this arrangement is to allow the operator an unobstructed view of the line written or that portion of it which has been written, so that he may read his work; but when the escapement-bar $A^4$ is depressed by the action of the link $K^3$ and connected mechanism, that is to say, by the operation of any type-key—the click-bar is depressed at its click-bearing end and raised at the end which holds the ribbon-moving lever O and allows the forward end of this lever to rise and the back end to be depressed and the rock-shaft to be partially rotated, and thus the vibrator $O^6$ is caused to fall and bring the ribbon down upon or near to the surface of the paper—so that when the type reaches and strikes the ribbon it is in such a position as not to blur the impression. This action of the mechanism is aided by the spring $O^7$, connected at one end to the upright of the frame and at the other end to a projection from the rock-shaft $O^4$, and the return of this mechanism to its normal or raised position is of course caused by the main spring actuating the click-arm $K^6$ and its finger $k^{16}$ upon the lever O so soon as pressure is removed from the finger-key. To the rock-shaft $O^4$ is also attached near either end an arm $P^5$, in the outer end of which is pivoted and carried a vertical spring-pawl $P^4$, engaging with the ratchet-wheel $P^3$, which is carried on a sleeve free to revolve upon the stud $P^2$, projecting from the pillar $A^3$. Upon this sleeve is carried so as to revolve with it a spool P'. The ribbon is wound on these two spools P' P', passing through the vibrator, as before described, on its way between the spools. The spring-pawl $P^4$ is extended below the arm $P^5$ and through a slot in the shifting-bar $P^6$, which also extends across the frame back of the platen and is connected to the frame by screws passing through two slots, which permit of its being thrown to the left or right for a short distance by means of a shifting-key $P^7$, and the upper part of the spring-pawl $P^4$ is free to move in a bracket $p^4$, connected with the frame, which rigidly holds the spring-catch $p'$, operating upon the teeth $k'$ in the ratchet $P^3$. Now the operation of this ribbon-feeding mechanism is as follows:

When the finger $k^{11}$ on the click-bar $K^6$ is raised and the ribbon-moving arm O allowed to rise, the outer end of the arm $P^5$ is raised and forces the spring-pawl $P^6$ upward, so as to give the ratchet-wheel $P^3$ an impulse and cause the spool P' to turn. When the lever O is released and the arm P[5] and spring-pawl P[4] are drawn downward again, the spring-catch $p'$, engaging with the ratchet on the spool, prevents its turning backward, and so the ribbon is slightly fed along for each impulse from a type-key I. When it has been fed along far enough and it is desired to change or to turn it the other way by means of the shifting-key, the bar P[6] (if the left-hand pawl has been used) is pulled to the right, swinging the foot of the left-hand pawl to the right and the top of it to the left against the catch $p'$, and the left-hand pawl P[4] is disengaged from the left-hand ratchet P[3], and by the same movement of the bar P[6] the right-hand pawl is made to engage in the right-hand ratchet P[3], so as to operate the right-hand spool and feed the ribbon in the opposite direction under the action of the feed-escapement.

In this machine I use two space-keys. One is shown at Q, being a strip of metal on the front side of the keyboard, bent downward at either end and connected with a space-key lever $Q'$, which is pivoted at $q$ and balanced or held upward in position by the spring $q'$. This space-key Q, having considerable transverse length, affords ready use by the thumbs and a steady action upon the space-bar K, a tooth of which is immediately beneath each space-lever $Q'$. I set this bar to move a short space—about the space of a letter—for the ordinary space between words. I also use another space-key standing at the right-hand end of the keyboard and connected in the same manner as the type-keys with a lever underneath, but so as to operate upon the space-bar K and through it upon the escapement to effect a spacing double of that effected by the key Q in distance.

I use by preference for the type-bars strips of thin rigid metal, so as to take little room sidewise and yet to be strong and steady to resist the strains to which they are subjected. My construction of a tubular type-seat attached to the end of these bars contributes to the lightness of the structure and at the same time to the effectiveness by reason of the ready adaptation of the seat to the type-stem and the adjustment of the type-stem by rotation therein to its proper position for printing, and in using two types on the same bar this use of the bent tubular double type-seat in U form (shown) makes not only a light and effective attachment, but also an accurate and economical regulation of the distances apart of the type centers. It will be noticed, also, that these type-seats are attached to the type-bars, so as to form an extension in the same longitudinal direction and present the types in a line with the direction of the bar; also, that the arrangement of the type-bars is such that the direction of their action and of the types thereon are all radial toward the printing-point, and that this arrangement, besides contributing to correct action and simplicity of structure, permits of a greater number in the same space, or, which is the same thing, greater freedom of movement without conflict in a limited space which the bars occupy. This object of compactness without conflict is also the better attained not only by the placing of two types upon a bar, but also by placing two bars upon a bracket, one shorter and one longer, arranged one within the other or nearer to the printing-point than the other.

It will readily be seen that in order to produce a type-writing machine, as I have, in which the platen and paper-carriage are between the types and the keys and transverse of the machine, and to write the print so that the line printed is above the platen and in full observation of the operator, the type-bars must be arranged in an arc less than a semicircle about the printing-point, however numerous the bars may be, and this limited space requires great economy and some modifications of the structure in order to obtain a free action of each type-bar and at the same time firm and steady joints and connections. Conducive to this compactness and security are the type-bar brackets which I use, which I prefer to cut out of rigid sheet metal and to set edgewise radially toward the printing-point, and I hinge the two bars one on one side of the bracket and the other on the other, thus gaining freedom of movement in the least possible space. I make these type-bar brackets also adjustable toward and from the printing-point for ready adjustment of the types in assembling the machine, and also so that any one bracket is readily removable by withdrawing the small screw $e^3$, which holds it adjustably and removably in its seat for any necessary repair.

My improved joint for the type-bar, as shown in Fig. 14, gives it an easy and exact movement, while at the same time it preserves for the type-bar a rigid position laterally. Any slight movement of the joint sidewise allows at the other end, of course, considerable swing to the end of the type-bar laterally, which is mischievous. This joint is also readily adjustable for wear, and so preserves this steadiness of the type-bars when in constant use for a long time. In the construction of this joint I make a variation in form. For the arm $e$, for instance, Fig. 14, the type-bar F is on the right-hand side, (looking from the rear of the arm $e$,) and the pivot $F^2$ has a conical bearing in the bar F, is threaded next through the arm $e$, and held there securely by the set-nut $f^9$, while on the arm $e'$, Fig. 14[a], the bar $F'$ is held on the left-hand side, and the corresponding pivot $F^2$ has its conical bearing in the supporting-arm $e'$ and is threaded through the type-bar $F'$ and held by a set-nut $f^9$, leaving the right-hand side of the arm $e'$ without any projection to interfere with the operation of the type-bar F, located on the same side of the bearing $e$. I consider these forms substantially equivalent. This construction is necessary, for if the nut projected through on the opposite side, or, to state it differently, if the nut of the forward pivot extended to the side of the support corresponding with the side on which the rear arm is pivoted, the nut would be in the way and prevent the arm operating freely, and it was for this reason that the two constructions specifically illustrated in Figs. 14 and 14ª were used.

The object of my improved link-joint and thrust-link is to obtain a connecting-piece of mechanism which shall be rigid, readily removable, readily adjustable in length, and readily adaptable to connect the ends of two pieces which do not lie in the same plane, as it is obvious that the key-lever and the type-bar do not. It also affords the greatest economy and simplicity and lightness in structure and takes up the least room.

It is obvious that in constructing the vibrating mechanism or supporting devices for the hinge-joints of the type-bars upon the frame a less or greater number of parts may be used to accomplish the general purpose of support and vibration; but the structure I have shown is, it seems to me, the best for securing compactness, readiness of adjustment, freedom of action, and substantial accuracy of operation. The structure of the secondary frame-work, consisting in an arc-beam in the arc of a circle, with the printing-point or a line drawn perpendicular through it for a center, and a main transverse beam and the two upright pillars, affords rigid attachments for the four grand divisions of the mechanism which cluster about the printing-point—namely, the power and escapement mechanism, the carriage and platen mechanism, the ribbon mechanism, and the type-bar supporting and vibrating mechanism—and the arc-beam affords a secure attachment of this latter, as I prefer to make it by means of a series of studs or upright supports D D, arranged to hold a series of trunnion-joints to which the gang of the segment-supports are hinged. Great simplicity of this structure and a sufficient accuracy and directness of action are obtained by making this gang in these segment-blocks supported on the trunnions hinged in two groups of three to oscillate upon the trunnion-supporting joints by means of two trunnion-vibrating joints connected with the rock-shaft, which operates them so that each block of the gang, and therefore each type-bar held in the block, may be vibrated forward toward the platen in a direction substantially radial toward the printing-point instead of perpendicularly toward the platen, and by this means I vibrate all the type-bars at the same time an equal distance, and I do it by a very simple and easily-acting mechanism connected with and set in motion by a key, as $C^{13}$, on one side of the machine. As I place the less-used letters and characters on the inner and secondary arms of the type-bearing devices $f^3$, this shifting-key action is required with the types least used and does not materially interfere with the rapidity of the printing. I use a hinged space-bar operating beneath the levers connected rigidly with the escapement and carriage-feed mechanism, and instead of making this bar with a series of recesses and projections in the same plane I construct it, as better shown in perspective in Fig. 18, with a number of teeth or small transverse strips and bend these strips out of the plane of the middle or supporting part of the bar in such curves or form as to present the effect of projections and recesses, so far as the operation of them when adjusted is concerned, but also to produce by reason of their bent form and length and of the elasticity of the metal an adjustable series of rests, so that without the use of file or the expense and complication of screw devices by simply bending or straightening these transverse strips or teeth I adjust them to the proper position. By direct connection of this space-bar with the escapement and by the varying length of its teeth a variable escapement for each letter may be obtained, so that the carriage will be permitted to move a distance corresponding to the space occupied by the letter, as desired.

For simplicity, certainty, and durability I prefer to construct the incline $A^9$ in an integral piece with the main beam, though of course it may be separately attached. The arrangement with reference to this incline of the power-spring and escapement mechanism and their connections conduces to the main objects of the machine—namely, simplicity and accuracy of construction and such location or arrangement as to permit the paper to be printed upon the upper side of the platen and between the types and the keys and in full view of the operator at all times except when the individual type is in the act of making its impression. It will also be seen that by the mechanisms I employ for vibrating the ribbon and for feeding it I make the work of vibrating and feeding the ribbon to be performed by the power-spring instead of by the fingers. It will further be seen that by the system of balancing and retracting springs in connection with the detail construction described I produce a very easy movement of the keys and their levers. The principal work of the machine, except that of imparting motion to the individual type and the action of vibrating the type-bar support, is done by the machine. This reduction of muscular action and fatigue is an important item in a machine for constant use.

I do not claim, broadly, in a type-writing machine the printing on the top of a platen, or the arrangement of type-bars in the arc of a circle in rear of the platen, or a vibrating support for a type-bar, or a link-thrust connecting the type-bar and a key-lever, or a cylindrical platen and rack and pinion, or a power-spring and escapement, as I am aware that these things have been used or patented or shown and described before; nor do I claim, broadly, the combination, in a type-writing machine, with the types, of an inking-ribbon and an escapement by which the inking-ribbon is vibrated; nor the combination of an inking-ribbon and types and key-levers and an escapement controlled by the action of the key-levers and by which the ribbon is vibrated; nor the combination of a type-bar and a vibrating support to which it is hinged and a key-lever and connecting-link; nor the combination, with a transversely-moving platen, of a paper-guide and graduated scale and a stationary pointer to indicate the printing-point; nor the combination of a paper-guide parallel to the platen, guides attached at right angles to it, and means for adjusting them; nor a vibrating guide through which the ribbon runs; nor the combination of a platen with a rack and pinion and a variable escapement, as I am aware that Byron A. Brooks is at work in the same field and understand that he is before me in these things.

I do not claim the combination of an escapement ratchet-wheel, a spring operating said wheel, a detent-pawl pivoted to a stationary support and normally out of gear with said ratchet-wheel, a spring constantly operating to throw said pawls in gear with the ratchet-teeth on said wheel, and means separate from and operating independently for intermittently engaging and drawing said pawls out of contact with said teeth; nor the combination, with a spring, of a ratchet-wheel and two pawls alternately in gear with the ratchet-teeth on said wheel, one of said pawls having a variable oscillating motion about the center of said wheel in a direction opposite to the rotation of said wheel; nor the combination of a spring-and-ratchet wheel and two pawls alternately in gear with the ratchet-teeth on said wheel, one of said pawls having an opposite variable throw and the other acting as a detent.

I claim as new and of my invention—

1. An improved type-bar, as F, constructed with a bent tubular end piece of metal, as $f^3$, to receive and hold two type-stems, essentially as set forth.

2. The combination of two type-bars, as F F', of different lengths and a type-bar bracket, as E, constructed with two ears $e\ e'$ to receive and support the type-bars, one on either side, and with the shank, as $e^2$, and the means, substantially as described, for securing the bracket adjustably in a line radial to the printing-point.

3. The combination of a plurality of type-bars, each having a plurality of type, a single bracket E, which offers fulcrum-supports for the type-bars at different distances from the common printing-point corresponding to the difference in length of the type-bars, and a vibrating bracket-support, as C, and the connections, substantially as described, with a shifting-key $C^{13}$, whereby the bracket may be vibrated radially to the printing-point correspondingly to the distance between the types on each bar.

4. The combination of a series of type-bars, as F, and a series of fulcrum-brackets, and devices, substantially as described, supporting the bars and brackets in the arc of a circle about a printing-point, and a vibrating device, substantially as described, connected with a shifting-key constructed and operating to vibrate the series of bars and brackets radially to the printing-point into an arc of a different diameter.

5. Means for operating a series of type-bar supports, consisting in a catch-pin $C^3$, common to the series, a rocking shaft, as $C^8$, and a shifting-key, as $C^{13}$, and their connections, constructed and combined with the supports to operate essentially as set forth.

6. In a type-writing machine, the combination of a segment-block, as C, constructed with an arm, as C', and a series of slots, as $c'$, to receive and hold a series of type-bar brackets, and mounted, as at D D', upon an arc beam of the frame so as to be oscillated, and the means, substantially as described, for oscillating the block by a shifting-key to vibrate the brackets radially toward the printing-point.

7. A series of segment-blocks, as C, pivotally mounted in an arc of a circle about a perpendicular through the printing-point, combined with a series of type-bars and brackets held in each block, a rocking arm, as C' $C^2$, connected with the blocks, link-pins, as $C^3$, links, as $C^4$, and a rock-shaft and device, substantially as described, connecting the links with a shifting-key, as $C^{13}$, all constructed and operating, substantially as described, to vibrate the type-bars simultaneously in lines substantially radial to the printing-point.

8. An improved space-bar K, consisting in a strip of metal in which a series of teeth are transversely cut on one side and with said teeth bent to form a row of rests at irregular distances from the main line of the strip and constructed to be adjusted and to operate essentially as set forth.

9. In a type-writing machine, a type-bar and its support having adjacent parallel bearing-surfaces, one of said parts having an additional conical bearing-surface, and an adjustable pivot having a conical portion constructed to fit said conical bearing-surface, substantially as described.

10. An improved joint for a type-bar, constructed with adjacent parallel bearing-surfaces on the support and on the type bar and with adjacent conical bearing-surfaces in the type-bar and on the pivot, and means for setting up the latter.

11. In a type-writing machine, the combination, with a type-bar support provided with a plane vertical bearing-surface, of a type-bar having a plane vertical bearing-surface which is opposed to and guided by said plane bearing-surface of the support, and a bearing by which the type-bar is pivoted to the support and which is constructed to force the plane surface of the type-bar to contact with the plane surface of the support when the type-bar is vibrated on the bearing in a direction to effect printing, essentially as and for the purpose set forth.

JAMES S. COPELAND.

Witnesses:
 DAVID J. POST,
 GRACE M. BARNARD.